United States Patent [19]

Maehara et al.

[11] Patent Number: 4,967,051
[45] Date of Patent: Oct. 30, 1990

[54] HIGH-FREQUENCY HEATING APPARATUS HAVING START CONTROL DEVICE FOR MAGNETRON POWER SUPPLY CIRCUIT

[75] Inventors: Naoyoshi Maehara, Nara; Haruo Suenaga, Kyoto; Kazuho Sakamoto, both of Kyoto; Takashi Niwa, Nara; Kimiaki Yamaguchi, Nara; Takahiro Matsumoto, Nara, all of Japan

[73] Assignee: Matsushita Electric Industrial Co., Ltd., Osaka, Japan

[21] Appl. No.: 223,949

[22] Filed: Jul. 25, 1988

[30] Foreign Application Priority Data

Jul. 27, 1987 [JP] Japan .................. 62-187124
Jan. 28, 1988 [JP] Japan .................. 63-18002

[51] Int. Cl.⁵ .............................. H05B 6/68
[52] U.S. Cl. .................. 219/10.55 B; 219/10.55 E; 323/325; 323/901
[58] Field of Search ........... 219/10.55 B, 10.55 R, 219/10.55 E, 10.55 M; 99/325, 451; 363/97, 131, 123; 323/320, 325, 345, 349, 351, 901

[56] References Cited

U.S. PATENT DOCUMENTS 4,130,749 12/1978 Tanaka et al. ............ 219/10.55 B
4,525,615 6/1985 Wyland ................. 219/10.55 M
4,533,809 8/1985 Eke ..................... 219/10.55 B

FOREIGN PATENT DOCUMENTS 40638 12/1981 European Pat. Off. .
78325 5/1983 European Pat. Off. .
202579 11/1986 European Pat. Off. .
2936891 3/1981 Fed. Rep. of Germany .
2324116 4/1977 France .
1350919 4/1974 United Kingdom .
2182810 5/1987 United Kingdom .

Primary Examiner—Philip H. Leung
Attorney, Agent, or Firm—Spencer & Frank

[57] ABSTRACT

A high-frequency heating apparatus comprises a semiconductor power converter which is supplied with electric power from a commercial power supply, a radio wave radiation section which is energized by the semiconductor power converter, a control section which controls the operation of a semiconductor element of the semiconductor power converter, and a start control section which controls the operation of the control section at the start time of the high-frequency heating apparatus. The start control section controls the operation of the control section so that the radio wave output power from the radio wave radiation section at the start time of the high-frequency heating apparatus becomes greater than that in the steady operation state thereof, whereby optimization of the performance and price of the heating apparatus can be realized.

9 Claims, 9 Drawing Sheets

HIGH-FREQUENCY HEATING APPARATUS HAVING START CONTROL DEVICE FOR MAGNETRON POWER SUPPLY CIRCUIT

BACKGROUND OF THE INVENTION

1. Field of the Invention

The present invention relates to a high-frequency heating apparatus for heating such objects as foods and fluids, and, in particular, relates to a high-frequency heating apparatus using a semiconductor electric power converter for generating high-frequency power in an electric power supply section thereof.

2. Description of the Related Art

High-frequency heating apparatus such as a home or domestic microwave oven often uses a power circuit of a construction such as shown in FIG. 1. In FIG. 1, when an operation switch 1 is turned on, a commercial power supply 2 is connected to a high-voltage transformer 3. The output of the secondary winding of the high-voltage transformer 3 is rectified by a capacitor 5 and a diode 6 and is supplied to a magnetron 7. A heater winding 8 of the high-voltage transformer 3 is connected to the cathode of the magnetron 7 to heat the cathode. As a result, the magnetron 7 is caused to oscillate and produces a high-frequency electromagnetic wave (radio wave), thereby making it possible to effect induction heating.

FIG. 2A is a diagram showing a change with the passage of time of the radio wave output $P_0$ of the magnetron 7 after turning on the switch 1 at a time point $t=0$. When the switch 1 is turned on at time point $t=0$, the magnetron 7 is supplied with cathode heating power and high-voltage power at the same time. At time point $t_1$ about one or two seconds later, the cathode temperature sufficiently increases and the radio wave output $P_0$ rises, and thereafter the radio wave output is kept substantially constant as shown in FIG. 2A. The radio wave output may, of course, decrease to some degree with the lapse of time due to such factors as the temperature characteristic of the magnetron 7 and the high-voltage transformer 3. Nevertheless, the radio wave output $P_0$ (for example, 500 W) predetermined as a rated output of the particular apparatus is basically maintained.

FIG. 2B is a diagram showing the increase in temperature of the internal parts of a high-frequency heating apparatus after operation of the heating apparatus has been started. The temperature $T_M$ of the magnetron 7 and the temperature $T_a$ of the ambient air of the high-voltage transformer 3 increase in such a manner as shown in this diagram.

FIG. 3 is a sectional view of a high-frequency heating apparatus. A housing 9 has an oven 10, a magnetron 7, a high-voltage transformer 3, etc. arranged therein in the manner shown in FIG. 3, and they are forcibly cooled by a cooling fan 11. The efficiency of the magnetron 7 is about 60% and that of the high-voltage transformer 3 is about 90%, so that in the case of an apparatus with an actual radio wave output rating of 500 W, the magnetron 7 develops a loss of about 300 W and the high-voltage transformer 7 about 100 W. As a result, the temperature of these parts gradually increases during the operation as shown in FIG. 2B. The rate of this temperature increase is comparatively high up to a time point of $t_2$ (say, 15 minutes) determined by the thermal time constant of each part, and thereafter the temperature of the whole apparatus reaches a maximum temperature level at time point $t_3$ (say, in 60 to 120 minutes) where the temperature becomes saturated.

In this way, a high-frequency heating apparatus is composed of parts such as the magnetron 7 and the high-voltage transformer 3 which have comparatively low conversion efficiency and hence generate much heat loss, thus causing a comparatively high temperature increase during its operation and taking a long time before it reaches a stable temperature.

In order to guarantee the rated output $P_0$ of a heating apparatus, it is necessary to have the heating apparatus constructed by using insulating material and component parts capable of maintaining sufficient safety against such a heat loss. For this reason, the cooling conditions and the specifications of the parts of the apparatus are designed to meet the guarantee requirements. Specifically, the component materials, parts specifications and cooling structure are determined by sufficiently taking into consideration the temperature rise that occurs at the time point $t_3$ in FIG. 2B.

The cooling conditions and the parts specifications for the rated output of 500 W are greatly different from those for the rated output of 600 W. The generation of a loss by the magnetron 7, for example, differs between both rated outputs, so that, in the case of the rated output of 600 W, the magnetron 7 must have a bulky cooling construction, which results in an increase in the size and cost thereof, and the high-voltage transformer 3 is also obliged to have a large size and increased cost.

Thus, in a conventional high-frequency heating apparatus, as described above, the specifications of respective component parts are determined in such a manner as to guarantee safety and reliability of the apparatus under a temperature condition where the temperature rise caused by the heat loss has saturated.

However, high-frequency heating apparatus uses a special method of heating called induction heating, and the heating time thereof is comparatively short. It is often used with a very short heating time of less than five minutes when it is used for the purpose of reheating which is often the case with general home applications. That is, as shown in FIG. 2B, many operations come to end within the time $t_0$ an or so, and a temperature corresponding to the time to $t_3$ occurs rarely. Thus, most conventional high-frequency heating apparatuses that guarantee the temperature rise thereof to be reached at $t_3$, which is not required at all under many operating conditions, are operated within the time $t_0$. Thus, it can be said that such apparatuses have excessively high quality. Nevertheless, this substantially excessive quality has hitherto been considered as unavoidable in view of rare cases where the apparatus is operated under an operating condition that reaches the time point $t_3$.

SUMMARY OF THE INVENTION

Accordingly, a first object of the present invention is to provide a very low-cost high-frequency heating apparatus by optimizing the performance of the high-frequency heating apparatus for home applications to meet the operation mode in actual applications, while maintaining its minimum required performance.

A second object of the present invention is to provide a new magnetron power supply circuit suited for maintaining controllability, high density and compactness by improving the magnetron power supply circuit that is indispensable to achieve the first object.

A third object of the invention is to provide a new method of controlling the magnetron power supply circuit in order to achieve the first object.

According to the present invention, in order to obviate the above-mentioned disadvantages of the prior art apparatuses and to achieve the above-mentioned objects, there is provided a high-frequency heating apparatus comprising an electric power supply section fed by a commercial power supply or the like, an electric power converter having a semiconductor element for converting electric power supplied from the electric power supply section into high-frequency power, a control section for controlling the operation of the semiconductor element, a radio wave radiation section for radiating the output of the electric power converter as an electromagnetic wave, and a start control section for supplying a rise signal at the start of the operation of the heating apparatus and thereby controlling the energy level of the electromagnetic wave to be higher than that in a steady operation state of the heating apparatus.

In accordance with the above-mentioned construction, the control section of the heating apparatus is supplied with a rise signal from the start control section at the time of starting the operation of the high-frequency heating apparatus, whereby the control section controls the operation of the semiconductor element of the electric power converter to increase the electromagnetic wave output level to become higher than the steady operation level. As a result, in an initial stage of the operation of the high-frequency heating apparatus, it is possible to produce a radio wave output larger than that in the steady operation state thereby to shorten the heating time on the one hand and to keep the cooling structure, the heat resistance specifications and performance quality of the component parts at an appropriate level but not excessively high.

According to another aspect of this invention, when it is detected or anticipated that the heating time is long or repeated operations cause the temperature of heat-generating parts to rise higher than a predetermined level, the electromagnetic wave output is reduced to a steady state value. In this way, the amount of electric power handled by the heat-generating parts is reduced, which in turn reduces the amount of heat thereby generated, thus making it possible for the apparatus to operate within a temperature range in which reliability and safety are guaranteed.

According to still another aspect of this invention, the apparatus comprises a heating control section which makes it possible to adjust the operation time of the electric power converter in accordance with a rise signal or a signal substantially equivalent thereto supplied from the start control section. This heating control section detects the magnitude of the electromagnetic wave output, which is changed as mentioned above, in response to the rise signal from the start control section or a signal equivalent thereto, and the heating control section changes the operation time of the electric power converter in response to such a signal, with the result that, even under a varying electromagnetic wave output, the total amount of heating energy is maintained substantially constant. In other words, in the case of cooking an object of a predetermined amount, the heating control section controls to shorten the heating time when the level of the electromagnetic wave output is higher than the steady operation level, and to lengthen the heating time when the electromagnetic wave output is on the same level as the steady operation level. As a result, the functions of the heating control section enables an operator of the heating apparatus to perform the same manner of operation when cooking the same object without worrying about the magnitude of the automatically varying electromagnetic wave output.

DESCRIPTION OF THE PREFERRED EMBODIMENTS

An embodiment of the present invention will be explained below with reference to the accompanying drawings.

Figure 4:
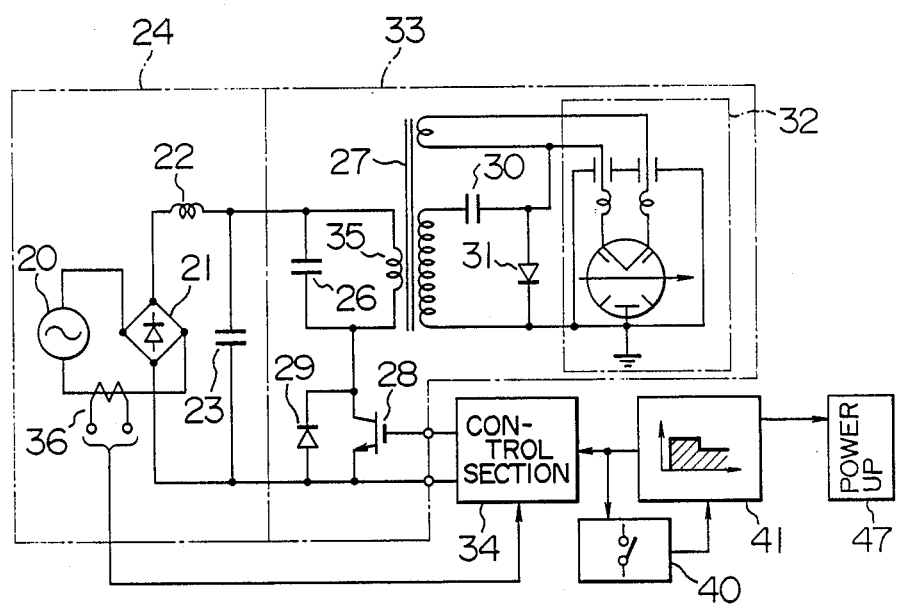
FIG. 4 is a circuit diagram of a high-frequency heating apparatus according to an embodiment of the present invention.

FIG. 4 is a circuit diagram showing a high-frequency heating apparatus according to an embodiment of the present invention. In FIG. 4, a commercial power supply 20, a diode bridge 21, and a filter circuit composed of an inductor 22 and a capacitor 23 make up an electric power supply section 24 for supplying electric power to an electric power converter 33. The electric power converter 33 includes an inverter having a capacitor 26, a step-up transformer 27, a transistor 28 and a diode 29, a high-voltage rectifier circuit having a diode 31 and a capacitor 30 for rectifying the output of the step-up transformer 27, and the magnetron 32 for generating high-frequency power. This magnetron 32 also serves as a radio wave radiation device for radiating the high-frequency power as electromagnetic energy. The electric power converter 33 may of course be alternatively formed of a semiconductor oscillator adapted to oscillate at 900 MHz or 2450 MHz and an antenna as a radio wave radiating element.

The transistor 28 performs a switching operation in response to a switching control signal of, say, 20 KHz to 200 KHz applied thereto from the control section 34.

Figure 5:
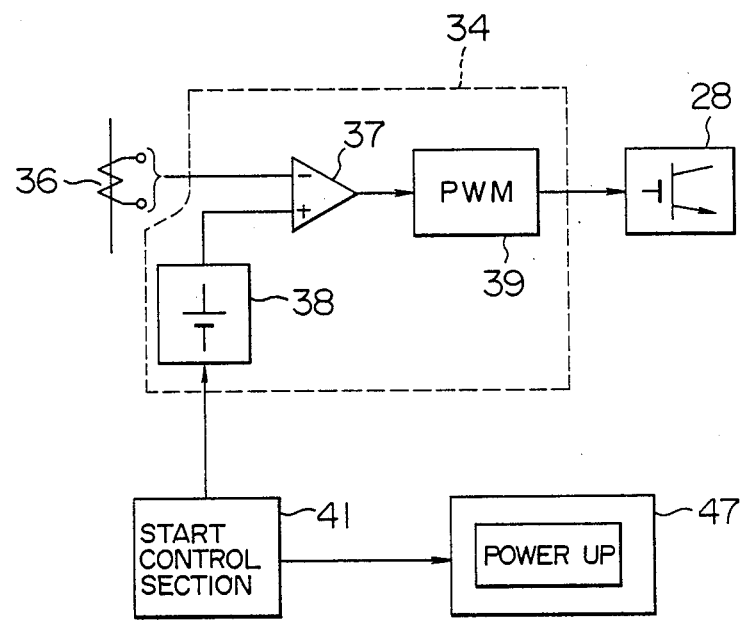
FIG. 5 is a block diagram showing the control section in the circuit shown in FIG. 4.
Figure 9A:
FIGS. 9A, 9B and 9C are waveform diagrams showing operation waveforms appearing in the circuit of another embodiment of the present invention shown in FIG. 4.
Figure 9B:
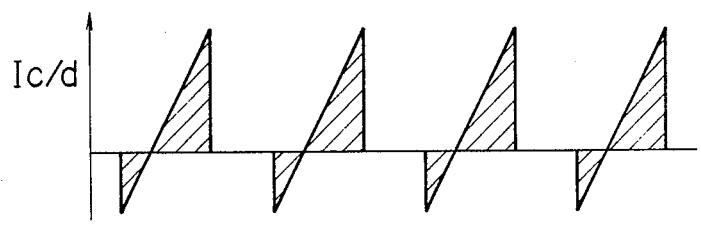
Figure 9C:
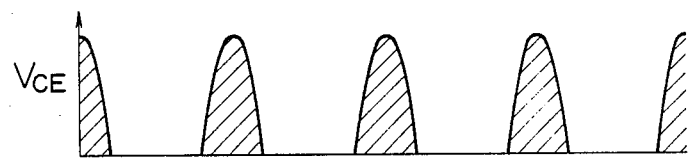

The control section 34 supplies the transistor 28 with a gate pulse $V_{GE}$ shown in FIG. 9A, and therefore the current $I_{c/d}$ flowing through the transistor 28 and the diode 29 and the collector-emitter voltage $V_{CE}$ of the transistor 28 take waveforms shown in FIGS. 9B and 9C, respectively. This electric power converter 33 operates as what is called the resonance-type inverter. Thus, a high-frequency voltage is generated across the primary winding 35 of the step-up transformer 27. This high-frequency voltage is boosted and rectified and supplied to the magnetron 32. The cathode heater of the magnetron 32, on the other hand, is supplied with cathode heating power from the heater winding of the step-up transformer 27. Hence, the magnetron 32 oscillates, and radiates a radio wave. The control section 34 is supplied with a signal proportional to the input current from an input current detector 36. This input current detection signal, as shown in FIG. 5, is supplied to an operational amplifier 37 in the control section 34, and is compared with a signal generated by a reference signal generator 38. A resulting difference signal is supplied to a pulse width control circuit 39. In this way, the conduction time of the transistor 28, namely, the pulse width $T_{on}$ of the gate pulse $V_{GE}$ shown in FIG. 9A is controlled. The input current is thus controlled to take a predetermined value by what is called the pulse width control. As a result, the electromagnetic wave (radio wave) output $P_0$ of the magnetron 32 is controlled to take a fixed value (such as 500 W).

In actuating the high-frequency heating apparatus having such a construction as mentioned above, a heating start command is applied from the heating control section 40 to the start control section 41. The start control section 41, upon receipt of the heating control command, supplies a rise signal to the control section 34 so that the apparatus may operate to produce an output (say, 600 W), which is larger than the rated output (say, 500 W) in a steady operation state, for a predetermined initial operation time period.

This rated output (500 W) in the steady operation state denotes the maximum output in a saturated temperature condition of various portions of the high-frequency heating apparatus when it has been placed in continuous operation, and is also the maximum output at which the life, reliability and safety of the heating apparatus can be ensured. Normally, in most cases, the maximum output at which a heating apparatus can continue its normal operation is its rated output. Thus, the high-frequency heating apparatus of this embodiment is designed to produce an output (say 600 W) during a predetermined initial operation time period, which output is greater than the electromagnetic wave output (say 500 W) in the steady operation state of the heating apparatus under an operating condition capable of continuously producing the maximum output.

Figure 6A:
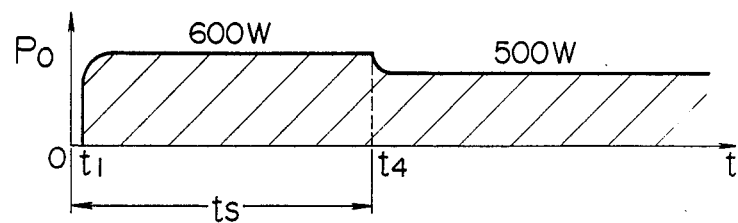
FIGS. 6A and 6B are time charts showing the change with the passage of time of the radio wave output of the same apparatus.
Figure 6B:
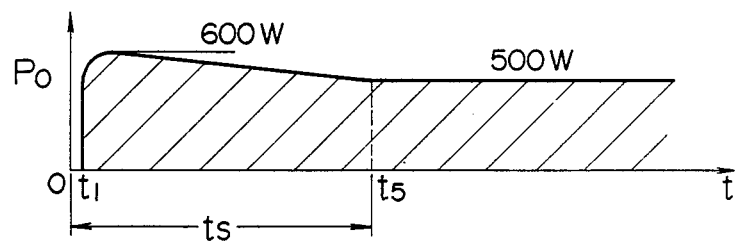

FIG. 6A is a diagram showing the manner in which the radio wave output $P_0$ changes with the passage of time. At the time point $t_1$ one second or two after the time point $t=0$ when the transistor 28 is turned on, the magnetron 32 starts to oscillate, and the radio wave output $P_0$ is controlled to take a value of 600 W which is larger than the steady operation value (namely, the rated value). At a time point $t_4$, that is, after the lapse of an initial heating time period $t_s$, the output $P_0$ is controlled to take a value of 500 W for the steady operation (that is the rated value). FIG. 6A shows a case in which the output $P_0$ is changed in steps. The same effect as this is obtained if the output $P_0$ is changed gradually during the time period $t_s$ as shown in FIG. 6B. As is seen from this, there are various methods that can be used to control the radio wave output $P_0$. As an example, this function can be easily realized by the circuit shown in FIG. 5 in which a signal generated by the reference signal generator 38 as a reference signal for the input current is controlled by the start control section 41. In other words, it is possible to realize this function by changing the reference signal for the input current after the lapse of the time $t_s$ so that a change in the output $P_0$ is caused as shown in FIG. 6A.

Figure 1:
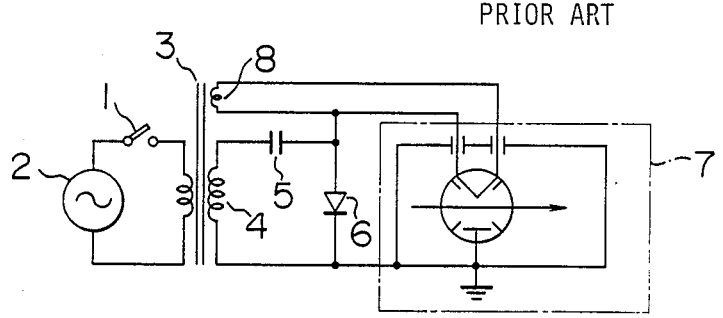
FIG. 1 is a circuit diagram showing a conventional high-frequency heating apparatus.
Figure 2A:
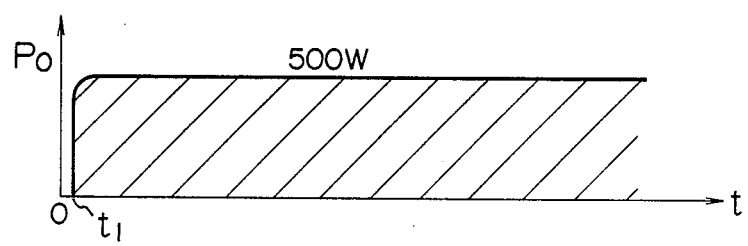
FIGS. 2A and 2B are time charts showing the change with the passage of time of the radio wave output and the temperatures of parts of the same apparatus.
Figure 2B:
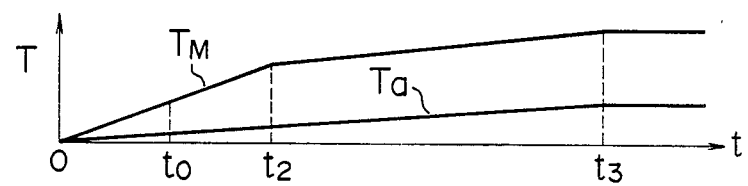
Figure 3:
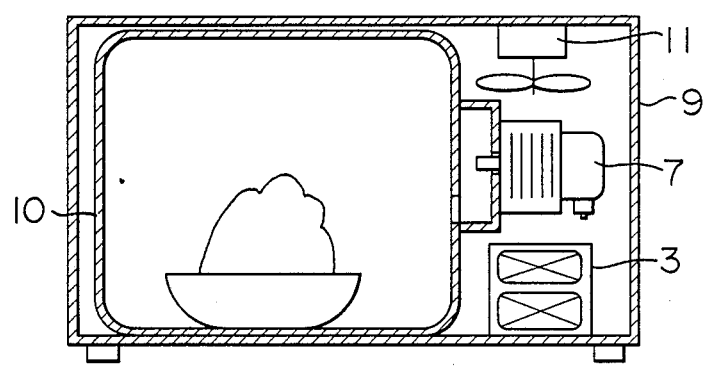
FIG. 3 is a sectional view showing the construction of the same apparatus.
Figure 7:
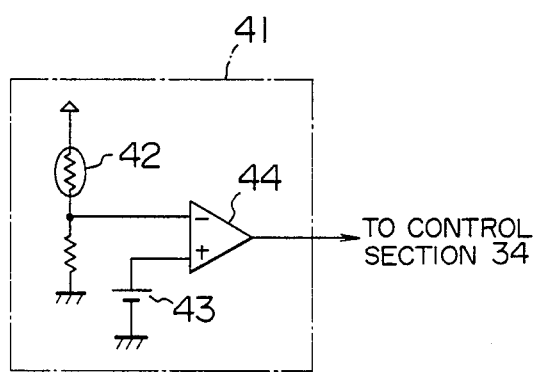
FIG. 7 is a circuit diagram showing another embodiment of the start control section of the same apparatus.

The time $t_s$ shown in FIG. 6A is the time during which an output, whose level is higher than that in the steady state, is generated as long as the temperature of the apparatus and its parts are sufficiently low. Thus, as seen from the diagram of FIG. 2B showing the prior art, $t_s$ should be determined to indicate a time during which the internal temperature of the heating apparatus and the temperature of the component parts are lower than a predetermined temperature. Accordingly, the period of time $t_s$ may be determined on the basis of the temperature control principle in which, for example, as shown in FIG. 7, a thermistor 42 is used to detect the anode temperature of the magnetron 32 as well as the ambient temperature thereof or the temperature of a radiation fin of the transistor 28, and the temperature detection signal is compared with a reference signal supplied from the reference signal generator 43 by a comparator 44. An increase in the anode temperature of the magnetron 32 causes the magnetic field intensity of the magnetron 32, if it is of the permanent magnet type, to be reduced, resulting in a lower operating voltage. If the control section 34 is constructed in such a manner that the anode current of the magnetron 32 or the secondary current of the step-up transformer 27 which is regarded to be equivalent thereto is detected and this secondary current is controlled at a fixed value, then it is possible to effect substantially the same control of the radio wave output in an initial stage of operation without detecting the anode temperature of the magnetron 32 with the thermistor 42.

In other words, in view of the fact that the operating voltage of the magnetron 32 is reduced with an increase in the anode temperature of the magnetron 32, the secondary current is regulated at a fixed value by the control section 34, thereby making it possible to reduce input power to the magnetron 32 by an amount corresponding to the operating voltage decrease. In this way, the radio wave output $P_0$ shown in FIG. 6B can be controlled in accordance with an increase in the anode temperature of the magnetron 32. As a result, a secondary current detector may be substituted for the temperature detector 42 shown in FIG. 7.

Figure 8:
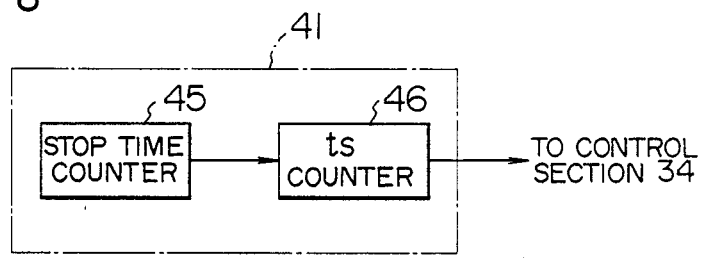
FIG. 8 is a block diagram showing still another embodiment of the start control section of the same apparatus.

As an alternative method, as shown in FIG. 8, a stop time counter 45 for counting the stop time of the units (that is, the time during which the apparatus and parts are cooled) may be inserted, so that a signal from this stop time counter 45 is used to determine the time $t_s$, and a start modulation counter 46 is provided to count the time $t_s$ and to cause an output of the input current reference signal generator 38 to be changed, after the lapse of the count time $t_s$, thus determining the time $t_s$ by detecting the operating conditions of the apparatus.

As another alternative method, it is also of course possible to fix the time $t_s$ to a short time of about five minutes, and the start control section 41 may be made up only of a timer.

In order to inform the operator of the heating apparatus that the radio wave output $P_0$ is controlled to take a value greater than that in a steady operation state, an indication section 47 as shown in FIG. 5 is provided and actuated by a signal from the start control section 41. Then, the operator is able to proceed with his cooking operation in recognition of whether the apparatus is powered up (that is, to 600 W) or in a steady operation state (500 W), thereby making it possible to perform a convenient and high speed cooking operation.

The heating control section 40 will be described more in detail. The heating control section 40, as shown in FIG. 4, is constructed so as to give a heating command to the start control section 41 for heating an object within a predetermined heating time and simultaneously to receive a rise signal from the start control section 41. This construction is intended to detect the present magnitude of the radio wave output (600 W or 500 W, for example). The heating control section 40 adjusts the heating time for the object in accordance with this detection signal. For example, in FIG. 6A, assume that the heating time terminates within the time $t_s$ and one actual heating time is 100 seconds. However, in the case of frequent and repeated use of the heating apparatus where the heating operation is repeated with the initial heating time period $t_s$ being substantially zero, the heating control section 40 automatically adjusts the electromagnetic wave output level to be 500 W and the heating time to be 120 seconds ($=100$ seconds $\times 600$ W/500 W). There may of course be also a case in between, in which case, too, the heating time is adjusted according to the level of the electromagnetic wave output $P_0$. Thus the operator is able to operate the apparatus without worrying about the change in the level of output $P_0$ in the same manner as if the output $P_0$ remains always at, say, 600 W even in a rare heating case where the time $t_3$ is substantially zero. Thus, a high-frequency heating apparatus easy to operate and having no excessive quality becomes available.

Figure 10:
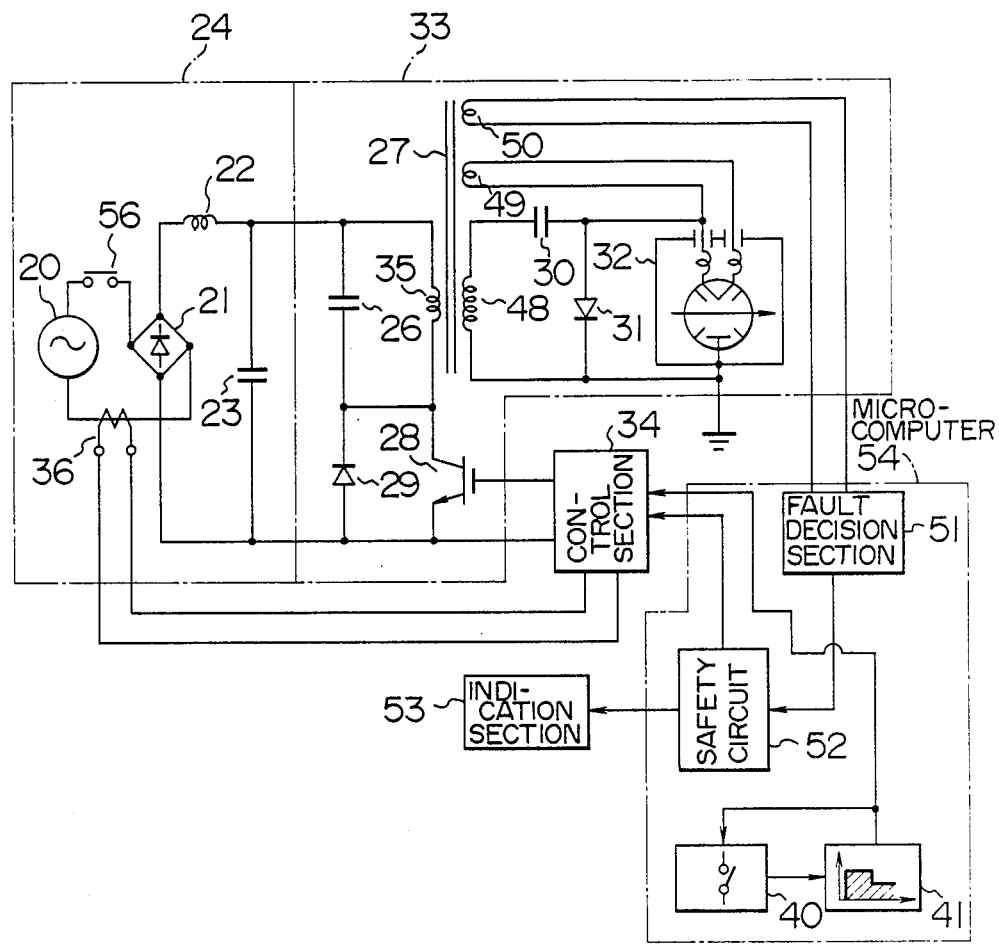
FIG. 10 is a circuit diagram showing the circuit construction of a high-frequency heating apparatus of still another embodiment of the present invention.

As another embodiment of the high-frequency heating apparatus described above, a configuration as shown in FIG. 10 using a microcomputer 54 is possible. In FIG. 10, those component parts designated with the same reference numerals as used in FIG. 4 are respective corresponding parts, and they will not be described any further.

In the circuit construction shown in FIG. 10, the start control section 41 and the heating control section 40 described with reference to the embodiment of FIG. 4 are substantially included in the microcomputer 54. The timing control of the radio wave output $P_0$ such as shown in FIG. 6A or 6B is executed in accordance with a control program by this microcomputer 54. This control is easily realized by applying a detection signal from the thermistor 42 as an input signal to the microcomputer 54 in the case where the start control section 41 includes a sensor like the thermistor 42 as shown in the embodiment of FIG. 7. Further, in the case where the start control section 41 includes the stop time counter 45 and the $t_s$ counter 46 as in FIG. 8, all the functions of the start control section 41 are realized by the microcomputer 54. Any way, if the present invention is embodied as shown in FIG. 10 by using the microcomputer 54, the circuit construction is simplified and becomes compact, thus realizing high reliability due to reduced interconnections, etc.

In FIG. 10, the step-up transformer 27 is provided with a high-voltage detection winding 50 as a fourth winding making up a high-voltage detector for producing a voltage proportional to the voltage across the high-voltage secondary winding 48. A detection signal from this high-voltage detection winding is applied to a fault decision section 51, in which the detection signal is compared with a reference signal upon the lapse of a predetermined time after the start of the heating apparatus which is counted by a timer (not shown) contained in the microcomputer 54. The result of this comparison is supplied to a safety circuit (safety means) 52. Referring to FIG. 14C, the fault decision section 51 decides whether $V_{AK}$ (that is, the detection signal) is larger than the reference signal (that is, $V_{th}$ in FIG. 14C) and produces a result of decision at a predetermined time point between the time points $t_l$ and $t_2$ shown in FIG. 14C. The resulting signal is applied to the safety circuit (safety means) 52, which, if the voltage $V_{AK}$ is larger than the reference signal $V_{th}$, indicates the fact on the indicator 53 and sends a signal to the control section 34, thereby turning off the transistor 28 and de-energizing the power converter 33. Firstly, a conventional starting operation of a high-frequency heating apparatus will be explained with reference to FIGS. 14A, 14B and 14C.

Figure 13:
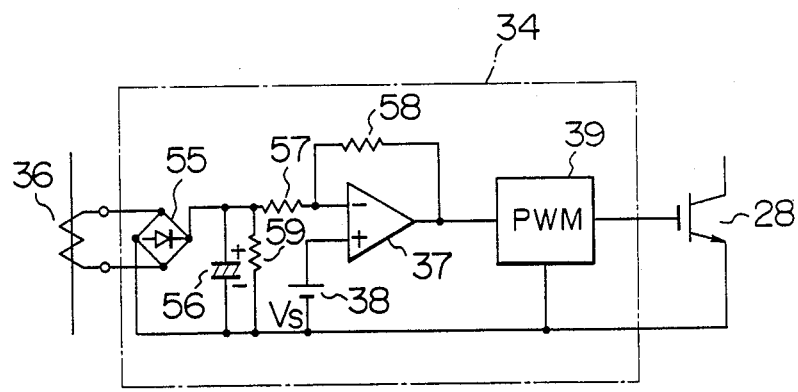
FIG. 13 is a circuit diagram showing a detailed construction of the control section of the apparatus.
Figure 14A:
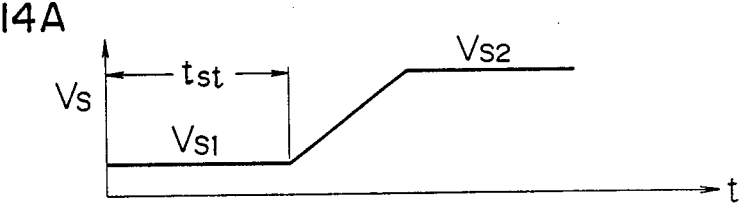
FIGS. 14A, 14B and 14C are explanatory diagrams for explaining the starting operation of the apparatus.
Figure 14B:
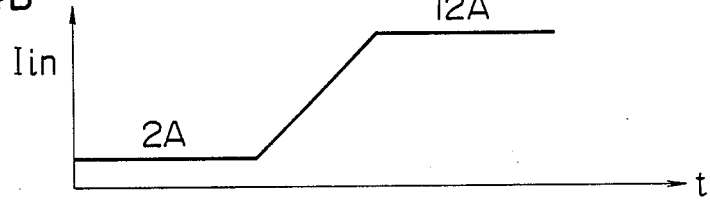
Figure 14C:
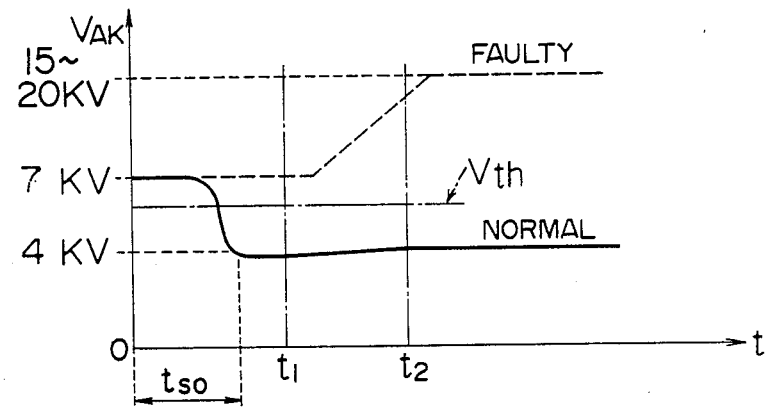

As shown in FIG. 14A, the voltage value $V_s$ of the reference voltage 38 in FIG. 13, which illustrates the construction of the control section 34 in further detail, was kept at a low value $V_{s1}$ during a time period $t_{st}$, and the voltage value $V_s$ was controlled to become an original set value of $V_{s2}$ after the lapse of the time $t_{st}$ (say, 3 seconds). As a result of this control, the input current $I_{in}$ is controlled to be 2 A (the output $P_0$ is almost zero) during the period $t_{st}$ as shown in FIG. 14B, and thereafter it is controlled to be maintained at 12 A (the output $P_0$ is 600 W). This control is effected to prevent the anode-to-cathode voltage $V_{AK}$ of the magnetron 32 from becoming excessive, before the completion of heating of the cathode of the magnetron 32. FIG. 14C shows the manner in which the voltage $V_{AK}$ changes in this process. Namely, the voltage $V_{AK}$, immediately after the start of the heating apparatus when the cathode of the magnetron 32 is not yet fully heated, assumes the value of 7 KV for $I_{in}$ of 2 A. After the lapse of $t_{so}$, the cathode is fully heated to cause the magnetron to oscillate, and then the voltage $V_{AK}$ is reduced to about 4 KV and reaches a steady operation voltage of the magnetron. Even with a subsequent increase of $I_{in}$ to 12 A, the $V_{AK}$ is kept to be about 4 KV, while, only the radio wave output is increased to 600 W, thus making it possible to maintain a normal operation. In this way, by switching the level $V_s$ of the reference voltage 38 by a timer means provided in the control section 34, the apparatus may effect its cold starting without generating any abnormally high voltage before the cathode of the magnetron 32 is heated.

If all the parts of the heating apparatus (especially including high-voltage circuit parts) are normal, a steady state is reached with the anode-to-cathode voltage $V_{AK}$ undergoing a change as shown by the solid line in FIG. 14C. However, in an abnormal state (for example, in such a case where one of the cathode terminals of the magnetron 32 is not connected), the anode-to-cathode voltage $V_{AK}$ undergoes a change as shown by a dashed line in FIG. 14C, generating an abnormally high voltage of 15 to 20 KV. This not only makes it impossible to obtain a radio wave output, but also generates a very dangerous discharge phenomenon. If the housing is not fully grounded, in particular, the potential of the housing reaches an abnormally high level due to the discharge phenomenon, thereby giving rise to a high possibility of posing a danger to the operator.

However, by arranging in the apparatus the above-described fault decision section 51, safety circuit 52 and indication section 53 shown in FIG. 10, it becomes possible to stop the operation of the transistor 28 and prevent the generation of an abnormally high voltage, thus guaranteeing high safety.

It is thus possible either to indicate the generation of an abnormally high voltage due to a fault or a connection failure of the parts of the high-voltage circuit and/or to prevent the generation of such an abnormally high voltage. As a result, an accident such as the generation of a high voltage due to the discharge phenomenon or electrical shock is prevented, thereby assuring safety upon occurrence of a fault in the electrical components. Especially when the power converter is constructed to stop its operation in case of trouble, a fault of the parts thereof or or an accident involving smoke or fire which might be caused by a discharge or excessive conduction of current is also prevented. Conflicts, if any, between the logical decision on a trouble or the stop or indication of the operation and the specifications of the cooking sequence control may be easily overcome by the double service of the microcomputer 54. Also, the operation of the power converter 33 is easily stopped by using a cooking sequence control relay or the like without adding a new component.

Figure 11:
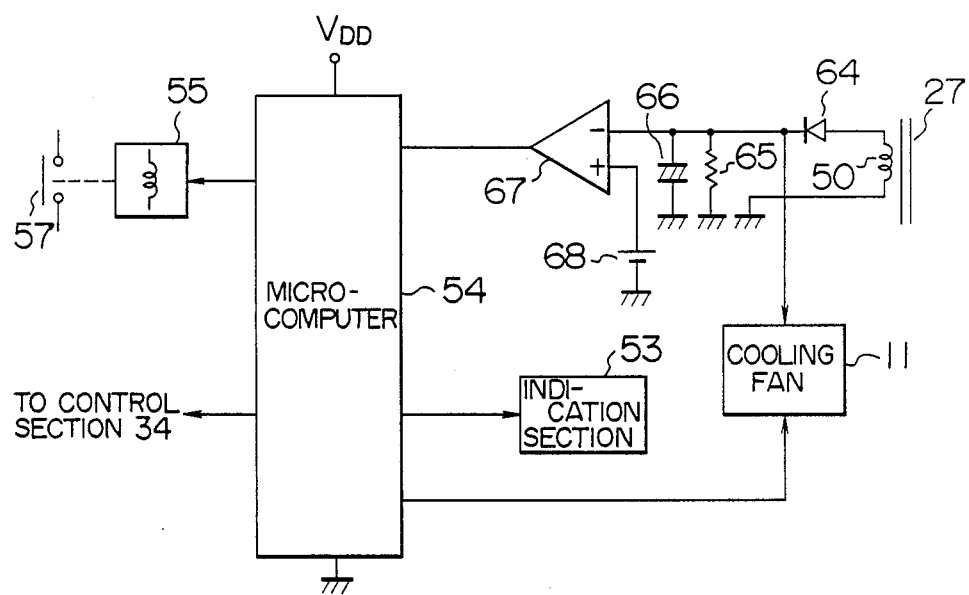
FIG. 11 is a circuit diagram showing a detailed construction of an embodiment of the essential parts of the apparatus.

FIG. 11 is a circuit diagram showing a more detailed embodiment of the fault decision section 51, the safety circuit 52 and the indicator 53. In FIG. 11, a detection voltage from the high-voltage detection winding 50 is converted into a DC voltage by a diode 64, a resistor 65 and a capacitor 66, and it is compared with a reference voltage in a comparator 67. This reference voltage 68 corresponds to the above-described voltage $V_s$ shown in FIG. 14A. The output of the comparator 67 is applied to the microcomputer 54. After the lapse of a predetermined time after the start of the heating apparatus, the microcomputer 54, by its logical operation, reads the output of the comparator 67 and decides whether $V_{AK}$ is larger than $V_{th}$. If $V_{AK}$ is larger than $V_{th}$, it decides that a fault is involved and causes the indicator 53 to indicate the fault. The microcomputer 54 also serves as a microcomputer for effecting the cooking sequence control of the high-frequency heating apparatus, in such a manner that the contact 57 of a relay 55 is opened or closed to control the control section 34 at the same time. This construction is adapted for the magnetron output control to execute the cooking sequence control.

The high-voltage detection winding 50 is insulated electrically from the high-voltage output circuit of the step-up transformer 27, and therefore the potential of the microcomputer 54 is insulated from the high-voltage output circuit. As a result of this insulating construction, there occurs no potential conflict between the high-voltage circuit and the microcomputer circuit, thereby assuring very high safety.

Figure 12:
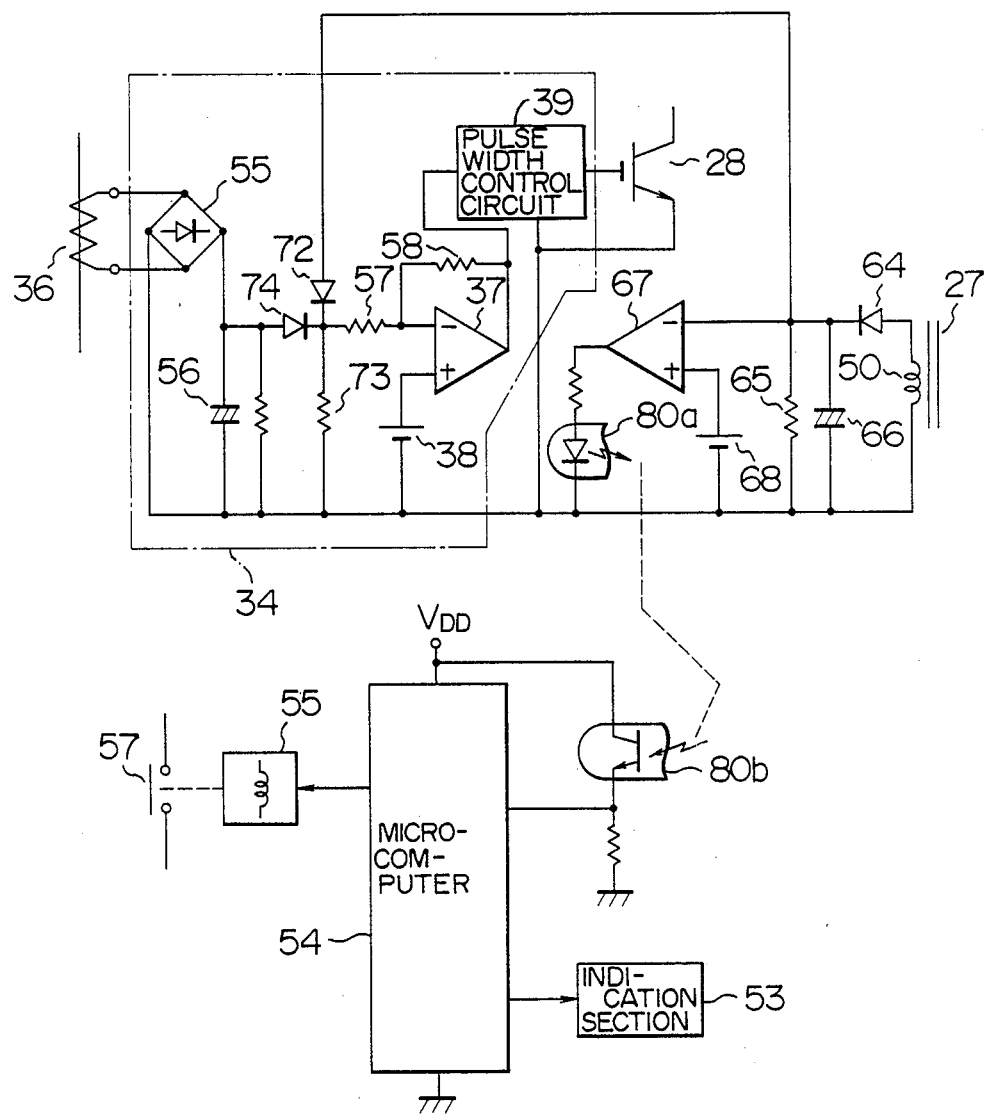
FIG. 12 is a circuit diagram showing the construction of another embodiment of the essential parts of the apparatus.

FIG. 12 is a circuit diagram showing a further detailed embodiment of the fault decision circuit 51, the safety circuit 52, the indicator 53 and the control section 34. In FIG. 12, in the control section 34, a resistor 73 is supplied with an output signal of the high-voltage detection winding 50 through a diode 72. The resistor 73 is also supplied with an output signal from a current transformer 36 through a diode 74. Thus, the pulse width modulation circuit 39 functions so that the greater of the a detection output signal from the high-voltage detection winding 50 and the detection output signal from the current transformer 36 becomes equal to the reference voltage 38. At the time of the start of the heating apparatus, therefore, $V_{AK}$ is controlled to a value below a certain level, and, when the magnetron oscillates, the input current is controlled to take a predetermined value.

The high-voltage detection winding 50, in addition to the above-mentioned function, also supplies a detection signal to the comparator 67 where the detection signal is compared with the reference signal 68 to determine whether an abnormally high voltage is generated or not. The resulting signal is supplied to the microcomputer 54 as an electrically insulated signal through photocouplers 80a and 80b. In this way, the microcomputer 54 is electrically insulated from both the high-voltage circuit and the electric power converter thereby to secure high safety.

As described above, the heating control section 40, the start control section 41 and the indicator 47 are component parts involving many logical operations or time control elements. Therefore, if a portion or all of these component parts are made up of a control means including logical operation means such as a microcomputer, the whole apparatus can be greatly simplified and reduced in cost.

A rise signal is not necessarily supplied from the start control section 41 to the heating control section 40. Instead, a similar signal equivalent to the electromagnetic wave output $P_0$ may be supplied from the control section 34 or the like.

Further, the heating time control of the heating control section in the above-mentioned embodiments relates only to the maximum output of the high-frequency heating apparatus. By means of a well-known interruption operation, however, similar heating time control may be effected in a case where the average output value is controlled to be about 200 W in the case of effecting a de-freezing operation.

It will thus be understood from the foregoing description that, according to the present invention, by comprising a power supply, a power converter, a radio wave radiation section and a start control section for increasing the electromagnetic wave energy in an initial stage of operation as compared with an amount thereof in a steady operation state, excessive quality may be prevented reasonably and economically, while securing safety and reliability at the same time.

Further, even when the electromagnetic wave output changes with the apparatus conditions, the heating control section completely releases the operator from the trouble of being worried about it and makes it possible to operate the apparatus in the same manner as if the output remains unchanged. A very high operation efficiency of a high-frequency heating apparatus is thus realized.

Furthermore, a logical operation means or a temperature detector, if inserted in the heating control section, can detect the temperature of the power supply section, the electric power converter and the radio wave radiation section at the time of the start of the operation. The optimum output determined as a result of the detection improves the efficiency of the heating operation to have a maximum value.

In addition, the apparatus comprises a high voltage detector for detecting an output voltage of a step-up transformer directly or indirectly, a fault decision section for making a comparison between a reference signal and an output signal of the high-voltage detector which is generated after the lapse of a predetermined time from the start of the operation of the apparatus, safety means for performing at least one of the indication of a fault and the stopping of the operation of the electric power converter in response to the application thereto of a fault decision signal from the fault decision section, and further a microcomputer for performing cooking sequence control and also serving to perform at least a part of the functions of the fault decision section and the safety means. Because of this construction, the generation of an abnormally high voltage that may be caused by a fault of component parts or any assembly error can be indicated and/or stopped. A trouble such as a fault of component parts, therefore, can be prevented from leading to a fire, electrical shock or other serious accidents, thereby realizing a high-frequency heating apparatus which assures very high reliability and safety. These processes of fault decision or indication or the stopping of high-voltage generation can be easily accomplished at very low cost without requiring an addition of any new relay in a manner free from its conflict with the cooking sequence control.

We claim:

1. A high frequency heating apparatus comprising:
   electric power supply means selected from one of a commercial power supply, a battery and an electric generator;
   an electric power converter having a semiconductor element for converting electric power supplied from said electric power supply means into high-frequency power;
   control means for controlling the operation of said semiconductor element of said electric power converter;
   electromagnetic wave radiation means connected to said electric power converter to receive the converted electric power therefrom for radiating an electromagnetic wave; and
   start control means for producing a rise signal and supplying the rise signal to said control means at the start of an operation of said heating apparatus to increase the converted electric power, thereby increasing the electromagnetic wave output to a level higher than that in a steady operation state of said heating apparatus under a continuously operable maximum output producing condition.

2. A high-frequency heating apparatus according to claim 1, wherein said start control means comprises a temperature detector for detecting the temperature of a selected one of said electromagnetic wave radiation means, a radiation fin of said semiconductor element, the ambient air of said electromagnetic wave radiation means and another component of said electric power converter, and wherein said start control means produces the rise signal in accordance with the temperature detected by said temperature detector, whereby the electromagnetic wave output is increased to the level higher than that in the steady operation state of said heating apparatus while the detected temperature is lower than a preset temperature.

3. A high-frequency heating apparatus according to claim 1, wherein said electric power converter means includes a step-up transformer having a secondary winding, said electromagnetic wave radiation means comprises a magnetron having an anode, and said start control means comprises a current detector for detecting a selected one of the current in the anode of said magnetron and the current in the secondary winding of said step-up transformer, said secondary current being substantially proportional to said anode current, and wherein said control means controls the operation of said semiconductor element in accordance with the detected current value of the selected one of the anode current of said magnetron and the secondary current of said step-up transformer so that the electromagnetic wave output is maintained at a level higher than that in the steady operation state of said heating apparatus for a selected time period at the start of the operation of said heating apparatus.

4. A high-frequency heating apparatus according to claim 1, wherein said start control means comprises temperature detection means for detecting the temperature of a selected one of the components of said electric power converter, said component being selected from said semi-conductor element, parts of said electromagnetic wave radiation means which generate heat and the ambient air thereof, said start control means generating the rise signal in response to an output signal from said temperature detection means.

5. A high-frequency heating apparatus according to claim 1, wherein said start control means includes timer means for measuring a stop time of the operation of said electric power converter, and said control means controls the power output of said electromagnetic wave radiation means in accordance with a signal representing the stop time supplied from said timer means.

6. A high-frequency heating apparatus according to claim 1, further comprising electromagnetic wave output indication means for indicating the magnitude of the electromagnetic wave output of said electromagnetic wave radiation means in accordance with a signal supplied from said start control means.

7. A high-frequency heating apparatus comprising:
   electric power supply means selected from one of a commercial power supply, a battery and an electric generator;
   an electric power converter having a semiconductor element for converting electric power supplied from said electric power supply means into high-frequency power;
   control means for controlling the operation of said semiconductor element of said electric power converter;
   electromagnetic wave radiation means connected to said electric power converter to receive the converted electric power therefrom for radiating an electromagnetic wave;
   start control means for producing a rise signal and supplying the rise signal to said control means at the start of an operation of said heating apparatus to increase the converted electric power, thereby increasing the electromagnetic wave output to a level higher than that in a steady operation sate of said heating apparatus under a continously operable maximum output producing condition, and
   heating control means connected to said start control means to receive therefrom one of a rise signal and an equivalent signal corresponding thereto, which signal indicates the magnitude of the electromagnetic wave output, said heating control means supplying to said start control means a heating command signal to adjust the operation time of said electric power converter in accordance with the magnitude of said electromagnetic wave output, thereby maintaining the total heating energy applied to an object to be heated at a predetermined amount.

8. A high-frequency heating apparatus according to claim 7, which further comprises logical operation means including said heating control means, said logical operation means processing said signal indicative of the magnitude of the electromagnetic wave output produced by said start 9. A high-frequency heating apparatus according to claim 8, wherein said logical operation means further functions as a logical operation means for effecting cooking sequence control.

* * * * *

UNITED STATES PATENT AND TRADEMARK OFFICE
CERTIFICATE OF CORRECTION

PATENT NO. : 4,967,051

DATED : October 30, 1990

INVENTOR(S) : Naoyoshi MAEHARA ET AL.

It is certified that error appears in the above-identified patent and that said Letters Patent is hereby corrected as shown below:

ON TITLE PAGE:
[75] Inventors: Naoyoshi Maehara, Nara; Haruo Suenaga, Kyoto; Kazuho Sakamoto, Kyoto; Takashi Niwa, Nara; Kimiaki Yamaguchi, Nara; Takahiro Matsumoto, Nara; Daisuke Bessyo, Yamatokoriyama; and Koji Yoshino, Kyoto, all of Japan Signed and Sealed this First Day of September, 1992

*Attest:*

DOUGLAS B. COMER

*Attesting Officer*  Acting Commissioner of Patents and Trademarks